United States Patent [19]

Malmström et al.

[11] 4,445,814
[45] May 1, 1984

[54] APPARATUS FOR DEPOSITING SOLID PARTICULATE MATERIAL IN A FRUSTOCONICAL PILE

[75] Inventors: Per-Ove Malmström, Harnosand; Karl E. A. Dyrén, Ornskoldsvik, both of Sweden

[73] Assignee: KMW-Mekan AB, Ornskoldsvik, Sweden

[21] Appl. No.: 353,706

[22] Filed: Mar. 1, 1982

[30] Foreign Application Priority Data

Mar. 25, 1981 [SE] Sweden .................................. 8101918

[51] Int. Cl.³ ................................................ B65G 65/30
[52] U.S. Cl. ........................................ 414/295; 198/508; 198/631; 414/133; 414/300
[58] Field of Search ................ 414/133, 293, 294, 295, 414/300, 302, 307, 310, 523; 198/508, 631

[56] References Cited

U.S. PATENT DOCUMENTS

| | | | |
|---|---|---|---|
| 1,570,085 | 1/1926 | Saxe | 414/310 |
| 2,717,703 | 9/1955 | Kull et al. | 414/300 |
| 3,205,859 | 9/1965 | Fine et al. | 198/631 X |
| 3,319,808 | 5/1967 | Sackett | 414/294 X |
| 3,456,818 | 7/1969 | Massey | 414/302 |

FOREIGN PATENT DOCUMENTS

374320  6/1932  United Kingdom ................ 198/508

*Primary Examiner*—Leslie J. Paperner

[57] ABSTRACT

Apparatus is provided for depositing solid particulate material in a frustoconical pile within a space of predetermined dimensions comprising, in combination:

(a) a screw conveyor for particulate material arranged substantially horizontally;
(b) means for feeding particulate material to the screw conveyor;
(c) the screw conveyor having a screw mounted at one end for driven rotation and operatively disposed in the screw conveyor for receiving and transporting particulate material therealong;
(d) means for depositing particulate material conveyed by the screw conveyor as a pile below the conveyor up to a maximum height corresponding to the level of the screw;
(e) the screw being arranged when maximum pile height is reached to carry particulate material at its level along the top of the pile to an outer edge thereof for deposit there, thereby leveling off the top of the pile and maintaining a frustoconical shape in the pile, while ensuring spreading of the pile of particulate material throughout and within a space of predetermined dimensions.

9 Claims, 3 Drawing Figures

APPARATUS FOR DEPOSITING SOLID PARTICULATE MATERIAL IN A FRUSTOCONICAL PILE

Many types of apparatus are known for depositing solid particulate materials such as wood chips, seeds, ore, slag, coal, gravel, and waste materials in a pile upon and within a storage site or space.

One type of such apparatus is provided with a substantially horizontally positioned screw conveyor which is swingably mounted on a support and provided with an inlet at one end and an outlet at the other end for feeding particulate material to the pile. One such apparatus is described in U.S. Pat. No. 1,184,942. The screw conveyor is enclosed for its entire length in a drum, with the outlet to the pile at the outer free end of the screw conveyor. Consequently, when the screw conveyor is stationary, the material from the outlet falls to form a conical pile, while when the screw conveyor is swung about in a substantially horizontal plane on the support, the material is deposited in the form of a ring, or segment of a ring of conical vertical cross-section. If the space within which the pile is to be formed is to be utilized to the fullest possible extent, a high ratio of pile volume to storage area must be maintained. This means that the screw conveyor must be placed placed high over the storage space, so as to form a pile whose height is great enough to provide the desired volume within the conical pile form. However, placing a screw conveyor at a considerable height incurs high building costs and expensive and relatively long transport lines to the screw conveyor, and in addition at great heights in the open the risk is higher that the material will blow away as it falls to the top of the pile.

The invention provides apparatus for depositing solid particulate material in a pile whose height at equivalent volume could be only half the height required for the pile when using available apparatus, without an appreciable increase in the area of the storage site or space, and in certain cases the storage space can even be reduced.

The apparatus in accordance with the invention for depositing solid particulate material in a frustoconical pile within a space of predetermined dimensions comprises, in combination:

(a) a screw conveyor for particulate material arranged substantially horizontally;

(b) means for feeding particulate material to the screw conveyor;

(c) the screw conveyor having a screw mounted at one end for driven rotation and operatively disposed in the screw conveyor for receiving and transporting particulate material therealong;

(d) means for depositing particulate material conveyed by the screw conveyor as a pile below the conveyor up to a maximum height corresponding to the level of the screw;

(e) the screw being arranged when maximum pile height is reached to carry particulate material at its level along the top of the pile to an outer edge thereof for deposit there, thereby leveling off the top of the pile and maintaining a frustoconical shape in the pile, while ensuring spreading of the pile of particulate material throughout and within a space of predetermined dimensions.

Calculations shown that at equivalent pile volume, reducing the height of the pile at the apex by half only requires from 5 to 7% more storage area. The requisite storage area can also be reduced by building the pile up against a wall. Because the apparatus of the invention can build a pile whose height at equivalent pile volume is less than the height of a pile formed by conventional apparatus, the height of the screw conveyor over the storage space can be reduced to less than the height of the conveyors of known apparatus, and transportation of the solid particulate material to the conveyor can be greatly simplified, lowering construction costs and costs of operation, and also greatly reducing the risk of material being blown away during deposition on the pile.

A preferred embodiment of the invention is described in more detail in the accompanying drawings, in which.

Figure 1:
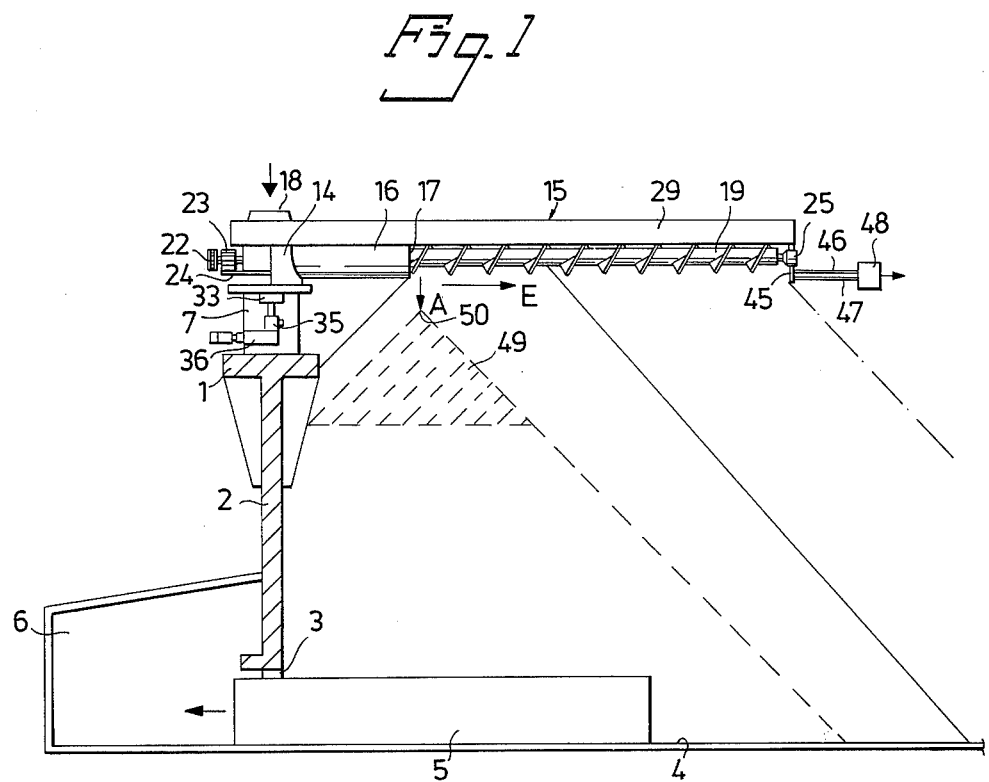
FIG. 1 is a simplified side view of a pile-forming apparatus constructed in accordance with the invention.
Figure 2:
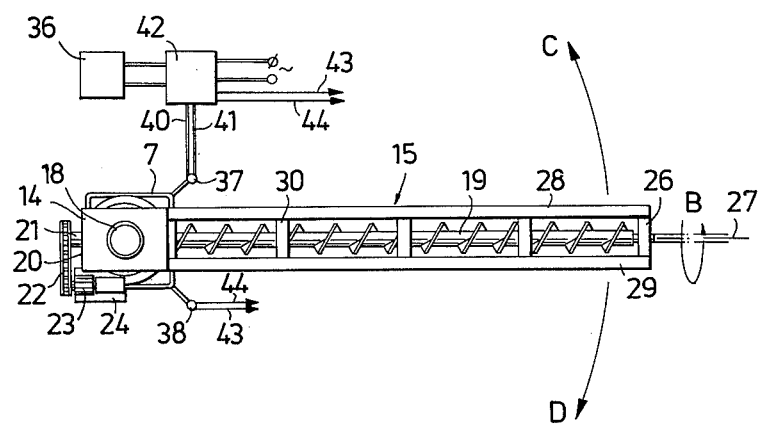
FIG. 2 is a top plan view of the screw conveyor of the apparatus of FIG. 1.
Figure 3:
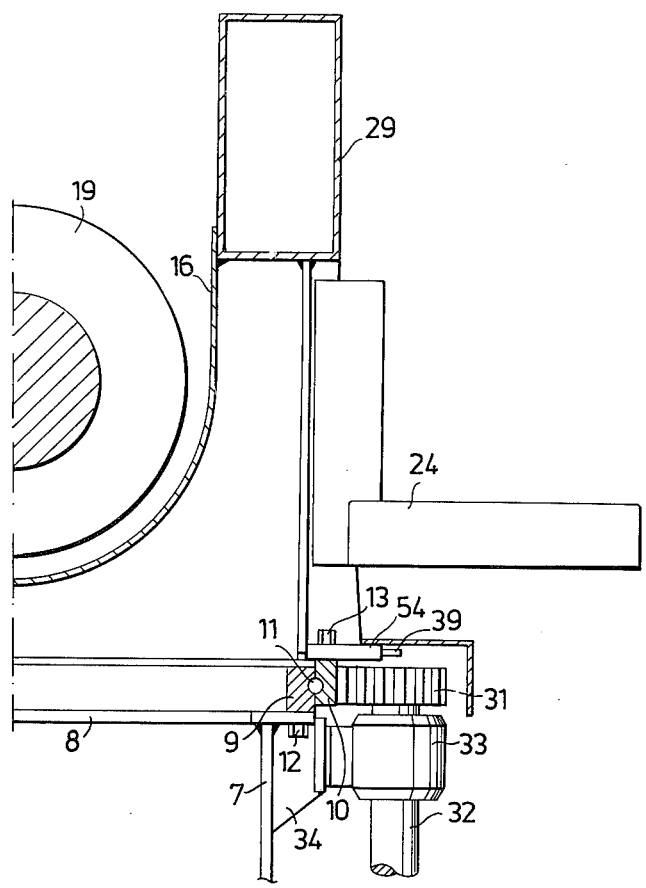
FIG. 3 is an end view with parts cut away, and on a larger scale, of the apparatus of FIG. 1 showing rotatable bearing means for the screw conveyor, and drive means for swinging the screw conveyor about its support in a substantially horizontal plane, and also showing in section supporting beams and adjacent parts of the screw conveyor.

The pile-forming apparatus according to the invention illustrated in FIGS. 1 to 3 includes a platform 1 which is fixedly mounted on top a wall 2 of a building (not shown). The wall 2 has at its base an opening 3 through which solid particulate material can be fed from a storage site 4 to a receiving bin 6 by means of a conveyor 5. The conveyor 5 can be of any suitable kind, for example, a stoker-type conveyor. On the platform 1 is mounted a box-like support 7. As best seen in FIG. 3, to the support 7 is welded or bolted a circular plate 8, but the plate may have any suitable configuration.

The plate 8 carries a semi-circular bearing half 9, having a circumferential groove semi-circular in cross-section arranged to absorb both radially and axially acting forces. A suitable bearing is marketed by Rotne Erde under the reference number 061.25 0980.03.11 604 M=8 K=133. The other semi-circular bearing half 10 is similar to the bearing half 9, and has a matching circumferential groove of semi-circular cross-section, the two grooves together defining a channel 11 circular in cross-section and sized to accommodate ball bearings (not shown). The bearing half 9 is secured to the plate 8 by means of bolts 12, while the bearing half 10 is secured by bolts 13 or any other suitable means to a circular, swingable annular support 54 which carries the screw conveyor, composed of a conveyor housing 14, and a screw 15.

The housing 14 carries a substantially U-shaped trough 16, open at the top, from the outer end 17 of which solid particulate material entering the housing 14 at inlet 18 and carried therealong by the screw 19 in the direction of arrow A is deposited to form a pile against the wall 2. The inner end of the screw 19 (shown to the left of FIG. 1) is so arranged in the housing 14 and trough 16 and the screw blades are at a pitch such that upon rotation of the screw in one direction material is carried to the outlet end 17.

The screw 19 is journalled at the inner end thereof in the wall 20 of the housing 14, and at that end is provided with an outwardly projecting shaft 21 which is driven in the direction of arrow B (FIG. 2) by means of drive means 23, suitably an electric motor, via a transmission 22, for example, a gear transmission or a chain transmission. The drive means 23 is mounted on a bracket 24 fixed to the housing 14. The outer end of the screw 19 is journalled in a bearing 25 arranged on a transverse member 26. The screw 19 is supported upon and stiffened by two box beams 28 and 29, which extend parallel with the axis of rotation 27 of the screw, and which are joined together by transverse members, a transverse member 30 and the aforesaid transverse member 26, arranged above the screw. The inner ends of the beams 28, 29 are fixedly connected to the housing 14 in conventional manner (not shown), preferably bolted to the housing.

As best seen in FIG. 3, the bearing half 10 has an outer gear ring which meshes with a gear 31 arranged on a shaft 32. The shaft 32 is journalled in an upper bearing 33, which is carried on support 7 by means of a bracket 34, and in a lower bearing 35 (FIG. 1), which is also carried by a bracket structure on the support 7. As shown in FIG. 1, the shaft 32 is coupled to a reversible drive means 36, such as a reversible motor. When the reversible drive means turns in one direction or the other, the outer bearing half 10, and therewith the screw conveyor 15 with the housing 14, 16, is swung over the storage site 4 in a substantially horizontal plane, as shown by arrows C and D in FIG. 2. The material fed from the outlet end of channel 16 is therefore deposited as an annulus along a circular or semi-circular path. When the pile is free-standing, i.e., not supported by a wall, the screw conveyor need be swung in only one direction. When, on the other hand, the pile is formed against a wall or like support, the screw conveyor is moved forwards and backwards.

In the apparatus shown in FIGS. 1 to 3, the arc through which the conveyor and housing can be swung in said horizontal plane is limited by means of limit switches 37 and 38 (FIG. 2), arranged to reverse the drive direction of the reversible drive means when the screw conveyor reaches its selected limit of swing in either direction. Fixed to the rotatable, circular ring 54 is an abutment stop 39 (FIG. 3). When the screw conveyor 15 is swung in the direction of the arrow C, the abutment stop 39 eventually comes into contact with, or its presence is sensed by, the limit switch 37. The limit switch then actuates a reversing means 42, associated with said reversible drive means 36 through electric conductors 40, 41, so as to reverse the direction of drive of the drive means, and to swing the conveyor 15 in the opposite direction, i.e., in the direction of arrow D. When the abutment stop 39 reaches the limit switch 38, a reversing signal is sent to the reversing means 42 through electric conductors 43, 44, thereby again to reverse the drive direction of drive means 36. Both limit switches 37, 38 can be placed in any selected postition around the support 7, to vary the arc limits through which the conveyor can be swung.

At the outer end of the conveyor 15 is a sensor 45, 46, which detects the presence of material piled in the immediate vicinity of the outer end of the screw 19, and in so doing sends a stop signal to a cut-off switch 48, which, when activated, breaks the current to the drive means 23, thereby stopping the screw 19 and the conveyance of material to the outlet 17. The sensor 45 can be actuated by mechanical, photoelectric, or capacitor means, or in any other suitable manner.

As indicated in FIG. 1, the material discharged from the trough 17 forms a pile which rises up against the wall 2, and initially has an unsupported apex portion 49 in the shape of a pointed cone. The apex 50 of the cone will ultimately rise to within reach of the rotating screw 19, after which any additional material is not discharged, but is instead transported by the screw conveyor further along the top of the pile in the direction of arrow E, thereby adding the material to a pile whose height is limited to the elevation of the screw conveyor, and forms a frustoconical pile with a substantially flat top surface, i.e., the part of the cone standing away from the wall 2 has the form of a truncated cone. As the diameter of the flat top surface portion increases, the arc through which the conveyor 15 is swung is also increased. When so much material has been discharged onto the pile that the periphery of the substantially flat top portion reaches the sensor 45, feed-in is stopped.

The pile can be formed with manual control of the swing of the conveyor 15. A machine operator can control swinging of the conveyor in the horizontal plane according to the diameter of the flat frustonconical top surface, and stop the feed when a maximum pile volume has been obtained, i.e., when the flat top surface on the frustoconical pile reaches the outer end of the conveyor 15 or any other selected stopping point. The pile can thus be deposited in the form of a truncated cone, or in an annulus or segement of an annulus having a flat top surface.

The structural elements illustrated in the drawings can be varied without departing from the basic concept of the invention. For example, the upper portion of the screw 19 can be shielded by a protective cover, if so desired. It is only essential that the lower part of the screw 19 contact the material being transported thereby through the screw conveyor.

The illustrated U-shaped trough 16 can have the form of a closed duct. Preferably, however, the trough 16 is open at the top in order, if necessary, to enable the material to be forced out over the top of the sides for deposit onto the pile.

Instead of stopping rotation of the screw 19 by a signal from the sensor 45, the sensor can be arranged to generate an alarm signalling that supply of material has to be stopped, manually or automatically.

The material can also be fed into the housing 14, 16 from the side or the bottom by suitable feed conveyors. Further, although only one reversible drive means 36 has been illustrated and described, more than one such means can be employed.

Having regard to the foregoing disclosure, the following is claimed as the patentable and inventive embodiments thereof:

1. Apparatus for depositing solid particulate material in a frustoconical pile within a space of predetermined dimensions comprising, in combination:
   (a) a screw conveyor for particulate material arranged substantially horizontally and at a predetermined height above the pile;
   (b) means for feeding particulate material to the screw conveyor;
   (c) the screw conveyor having a screw conveyor housing and a screw mounted at one end of the screw conveyor housing for driven rotation and operatively disposed in the screw conveyor housing for receiving and transporting particulate material therealong from said one end to an opposite end thereof;
   (d) means at said opposite end of the screw conveyor housing for depositing particulate material conveyed by the screw conveyor along the housing as a pile below the conveyor up to a maximum height corresponding to the level of the screw;

(e) the screw extending beyond said opposite end of the screw conveyor housing so as to directly engage particulate material in the pile when the height of the pile reaches the screw so that when said height is reached the screw carries particulate material at its level along the top of the pile to an outer edge thereof for deposit there, thereby leveling off the top of the pile and maintaining a frusto-conical shape in the pile, while ensuring spreading of the pile of particulate material throughout and within a space of predetermined dimensions.

2. Apparatus according to claim 1 in which the screw conveyor is swingably mounted on a vertical support.

3. Apparatus according to claim 2 in which the screw extends beyond the screw conveyor housing a distance corresponding to the outer limit of the top of the frusto-conical pile deposited thereby.

4. Apparatus according to claim 2 having reversible drive means arranged to drive the screw conveyor in a reciprocating swinging movement relative to the support.

5. Apparatus according to claim 4 having switching means operatively connected to the drive means to determine limiting arc positions through which the screw conveyor is swung, and when such limiting positions have been reached to reverse the drive direction of the drive means.

6. Apparatus according to claim 1 in which the screw conveyor housing defines a trough open at the top for delivery of particulate material to the pile over the top of the trough.

7. Apparatus according to claim 6 in which the trough has an outlet opening on the bottom for delivery of particulate material to the pile.

8. Apparatus according to claim 1 having a sensing means placed at a limiting height and span position for the pile, sensing when that limiting height and span has been reached, and stopping the feed of particulate material to the pile.

9. Apparatus according to claim 8 having drive means for the screw, and in which the sensing means is arranged to send a stop signal to the drive means, therewith to stop feed of material to the pile.

* * * * *